United States Patent [19] [11] 3,706,323
Hayner et al. [45] Dec. 19, 1972

[54] BALL FLOW CONTROL VALVE

[72] Inventors: Paul F. Hayner, Lexington, Mass.;
David G. Eldridge, Nashua, N.H.

[73] Assignee: Sanders Associates, Inc., Nashua, N.H.

[22] Filed: Nov. 27, 1970

[21] Appl. No.: 93,309

[52] U.S. Cl............137/625.3, 137/489, 137/DIG. 2, 251/63.4
[51] Int. Cl.......................F16k 31/143, F16k 1/14
[58] Field of Search......137/DIG. 2, 449, 625.3, 489; 251/63.4

[56] References Cited

UNITED STATES PATENTS

| 2,985,141 | 5/1961 | Gustafson | 251/30 X |
| 2,967,544 | 1/1961 | Pearsall | 137/DIG. 2 |
| 3,269,406 | 8/1966 | Grose | 137/449 X |
| 1,546,032 | 7/1925 | Schroeder | 137/449 X |
| 740,972 | 10/1903 | Booth | 137/449 X |
| 1,989,870 | 2/1935 | Lafferty, Jr. | 137/DIG. 2 |
| 1,642,724 | 9/1927 | Fleming | 137/DIG. 2 |
| 3,529,628 | 9/1970 | Cummins | 137/625.3 |

*Primary Examiner*—Arnold Rosenthal
*Attorney*—Louis Etlinger

[57] ABSTRACT

A fluid flow control valve in which the element which variably impedes the flow of fluid therethrough is a ball, the position of which is controlled by a second ball in rolling engagement therewith.

14 Claims, 6 Drawing Figures

PATENTED DEC 19 1972

INVENTORS
PAUL F. HAYNER
DAVID G. ELDRIDGE

By W. L. Hunter

ATTORNEY

BALL FLOW CONTROL VALVE

FIELD OF THE INVENTION

This invention relates generally to valves, and more particularly to fluid flow control valves in which the flow of fluids therethrough can be varied continuously.

BACKGROUND

Fluid control valves of various kinds are well known. Some, such as the household water tap, control the pressure and/or rate of flow from an inlet conduit to an outlet conduit. Others, such as four way valves, control both the magnitude and direction of the flow of fluid to a load device such as a hydraulic ram. All of these have one or more moveable elements which impede the flow of fluid by variably occluding one or more openings or ports. Such elements have taken various forms, such as flat plates or gates, plates or discs with apertures, hollow cylinders with apertures, plugs moveable within such cylinders, and solid pistons or spools, as well as many other forms. In some valves, pistons equipped with piston rings have been provided to operate one or more flow control elements. However, such prior valves have been subject to a number of disadvantages. For example, many have exhibited excessive hysteresis in their operation, due largely to the inherent friction of these sliding parts. Such excessive hysteresis is especially objectionable in those valves in which the flow is controlled automatically. Additionally, many of theses valves exhibit excessive leakage when in their "off" positions. Furthermore, many are excessively noisy in operation.

It is a general object of the present invention to provide an improved flow control valve.

Another object is to provide a flow control valve which exhibits very little hysteresis in operation.

Another object is to provide a valve which exhibits very little leakage.

Another object is to provide a valve which is quiet in operation.

SUMMARY OF THE INVENTION

Briefly stated, a valve incorporating the present invention employs a first ball, which is the actual flow control element, and which is guided so that it may roll in a first straight line path between a fully closed position and a fully opened position. It is urged toward the latter position, for example by the pressure of inlet fluid, but is restrained by a second ball in rolling engagement therewith. The second ball is guided to roll in a second straight line path parallel to but slightly offset from the path of the first ball. A variable control force is applied to the second ball in such direction as to urge the first ball towards its closed position.

BRIEF DESCRIPTION OF THE DRAWINGS

For a clearer understanding of the invention, reference may be made to the following detailed description of the accompanying drawing in which.

DESCRIPTION OF PREFERRED EMBODIMENTS

Figure 1:
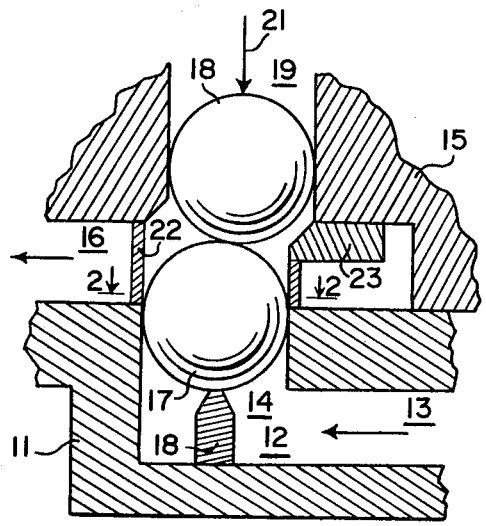
FIG. 1 is a schematic cross-section view illustrating the principles of the invention.
Figure 2:
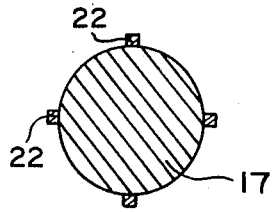
FIG. 2 is a cross-section view taken on the line 2—2 of FIG. 1.

Referring first to FIGS. 1 and 2 the lower portion 11 of the valve housing defines an inlet passageway 12, including a horizontally extending portion 13 to which inlet fluid under pressure is admitted and including an upwardly extending cylindrical passageway, or bore, 14. The upper portion 15 of the housing cooperates with the lower portion 11 to define an outlet passageway 16. In the closed position of the valve as shown in FIG. 1, a ball 17 having a diameter substantially equal to that of the bore 14 rests on a stop member 18. The center of the ball 17 is just below the bottom of the outlet passageway 16, so that none of this passageway is exposed to the inlet fluid. The ball 17 is held in this position by a second ball 18 in rolling engagement therewith. The ball 18 is positioned in another cylindrical passageway, or bore, 19 formed in the upper portion of the housing 15. The ball 18 and the bore 19 have substantially the same diameter which may be the same diameter as that of the bore 14 and ball 17, although this is not essential. The axis of the bore 19 is displaced a slight distance (a small fraction of the radius of either ball) from the axis of the bore 14. The walls of the bore 19 constitute guides which limit the movement of the ball 18 to a straight line path which is parallel to but displaced from the path of movement of the ball 17, as will be discussed further. The ball 17 is, of course, urged upward by the force of the fluid under pressure in the inlet passage 12, but this force is balanced by a control force, shown schematically by the arrow 21, which acts downwardly on the ball 18. This control force may be mechanical, pneumatic or hydraulic, or a combination thereof. It is apparent that the position of the ball 17 is controlled jointly by the downward force exerted by the ball 18 and the upward force exerted by the fluid under pressure in the inlet passageway 12. When the latter exceeds the former, both balls will rise. The ball 17 is constrained to a straight line path, the center of which is an extension of the axis of the bore 14, by any suitable arrangement, such as a plurality of guides 22 extending between the lower portion 11 of the housing and the upper portion 15 of the housing. The guide to the right as viewed in FIG. 1 is supported in part by a small block 23, which in turn is fastened to the upper portion 15 of the housing. The paths to which the centers of the balls are constrained are parallel but displaced from each other, and accordingly the balls are urged into contact with their respective guides. That is, the ball 18 is urged against the right hand surface of the bore 19 while the ball 17 is urged against the left hand surface of the bore 14 and against the left hand guide 22. As the balls move, they roll against each other and against their respective guides.

In operation, fluid under pressure is admitted to the inlet passageway 12 and the control force is selected, manually or automatically, so that the ball 17 rises sufficiently to expose just enough of the output passageway 16 so that the pressure and/or rate of flow therethrough is of the desired magnitude. Since the balls roll, there is very little friction and very little hysteresis. This is especially important in automatic control systems where, for example, the output pressure is controlled automatically, since it enables very close control to be achieved.

It is to be noted that in FIG. 1 the outlet passageway 16 is generally cylindrical in shape and is substantially open except for the guides 22. This passageway could, of course, be of many other configurations, such as a bore in a solid block or sleeve formed with one or more radial holes. However, it is preferred at present to use a stack of plates formed with baffles on one side, as will be more fully explained in connection with the remaining figures of the drawing.

Figure 3:
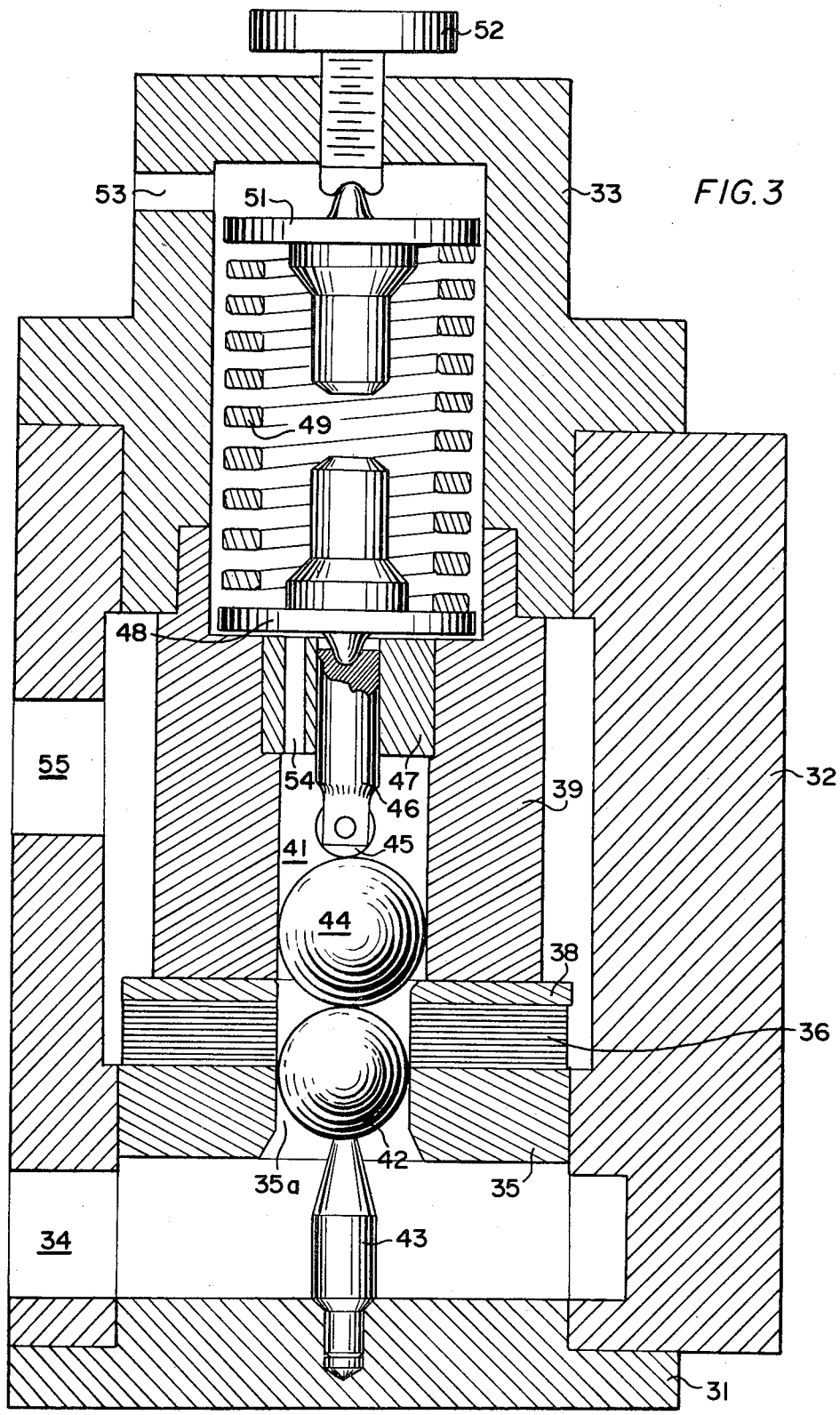
FIG. 3 is a cross-section view, partially schematic, of a valve incorporating the invention which is particularly suitable for use with a liquid such as oil.

Referring now to FIG. 3, there is shown a valve which is particularly suitable for use with a liquid such as oil. It will be understood that this showing is somewhat schematic in that certain well known parts, such as bolts, gaskets, and sealing rings have been omitted and that certain parts which may be shown as integral may be made in several parts and vice versa. The valve housing includes several blocks including a lower block 31, a central block 32, and an upper block 33, all fastened together. The central block 32 is formed with a large generally cylindrical bore. The upper block 33 is formed with a smaller central bore. The lower block 31 is shaped generally like a thick plate. The blocks 31 and 32 together define an inlet passageway 34 to which the source of fluid under pressure is connected. Fastened within the central bore of the block 32 near the bottom is a generally flat cylindrical block 35 formed to define a central, cylindrical passageway 35a. On the top of the block 35 is fastened a stack of thin circular plates 36, each formed with a central bore of the same diameter as that of the cylindrical passageway 35a in the block 35.

Figure 4:
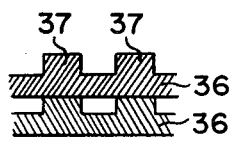
FIG. 4 is an enlarged, fragmentary cross-section view showing a portion of two of the restrictor plates of FIG. 3.
Figure 5:
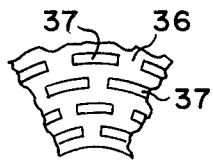
FIG. 5 is a fragmentary plan view of a portion of one of the restrictor plates.

As best shown in FIGS. 4 and 5, each of the plates 36 is formed with a plurality of baffles 37 on one surface. These may conveniently be formed by etching techniques. The plates are stacked one upon another and brazed together along the tops of the baffles 37. This arrangement of plates in and of itself is not a part of the present invention but is more fully described and claimed in the copending application of Paul F. Hayner and Richard J. Brockway Ser. No. 93,192 filed Nov. 27, 1970 for FLUID FLOW RESTRICTOR, which application is assigned to the same assignee as is the instant application. It is sufficient for present purposes to note that the arrangement of baffles as shown in FIGS. 4 and 5 provides a series of restrictions so that fluid can flow from the central bore outward and in so doing has its velocity reduced in a series of small steps as it encounters and passes through the various restrictions caused by the adjacent baffles. It has been found that such an arrangement of baffled plates is very effective in reducing the noise of operation of a valve, principally because there is not sufficient pressure drop across any one passageway to produce noise, cavitation, or erosion. The minute turbulence involved is quickly dissipated in shear losses in the fluid, that is in heating the fluid.

Fastened to the top of the stack of plates 36 is a thicker plate 38 of the same overall diameter and having a central bore of the same diameter as the bore 35a in the block 35. The block 38, in turn, is in engagement with another intermediate block 39 which in turn is fastened to the upper block 33. The block 39 is formed to define a central cylindrical passageway, or bore, 41, the diameter of which is larger than the diameter of the bore in the block 35 and the plate 36, and the axis of which is displaced slightly to the right thereof. The valve is shown in the closed position and in this position a ball 42, having a diameter substantially equal to that of the bore 35a is positioned partly in the passageway or bore 35a in the block 35, and partly in the bore of the plates 36, with the center of the ball slightly below the lowermost of the plates 36. The ball's downward movement is limited to this position where it rests on a stop member 43, which in turn is fastened to the lower block 31. A second ball 44, having a diameter substantially equal to that of the passageway 41, is positioned in that passageway and engages the ball 42. The ball 44 is also engaged by a small roller 45, rotatably mounted on a bracket 46 which in turn is slideably mounted in a bushing 47, fastened to the block 39. The bracket 46 is engaged by a protuberance on a plate 48 which in turn is urged downwardly by a spring 49, the upper end of which is engaged by a spring seat 51. The spring seat 51 is held in position, preferably adjustably, by any suitable means, illustrated schematically as comprising a screw 52 threaded into the upper block 33. The block 33 is formed with an aperture 53 to enable a source (not shown) of a fluid at a control pressure to be led to the interior of the block 33. An aperture 54 in the bushing 47 provides communication between the interior of the block 33 and the bore 41 so that the fluid at control pressure can act directly against the ball 44.

The series of stacked plates 36, with their central bore and their baffles, define a series of restrictive passageways. At the outside edge of the plates 36, these passageways communicate with a generally annular space between the inside of the bore in the block 32 and the outside of the block 39. This space may be coupled to external apparatus through an outlet passageway 55 formed in the block 32.

In operation, a source of fluid under pressure is connected to the passageway 34, a load device is connected to the aperture 55, and a source of control pressure is connected to the aperture 53. The pressure of the fluid in the passageway 34 acts on the bottom of the ball 42 and the resulting force raises both the ball 42 and the ball 44. As in the case of the embodiment of FIG. 1, the two balls roll against each other and against the sides of the various bores. It is to be noted that in the embodiment of FIG. 3, no separate guides for the lower ball are necessary since the ball is guided adequately by the inside edges of the plates 36. The balls 42 and 44 will rise until the forces exerted by the inlet fluid and by the control pressure are in balance. In this connection, it is to be noted that the ball 44 is slightly larger than the ball 42 so that the area of the ball 44 on which the control pressure acts is slightly larger than the area of the ball 42 on which pressure of the inlet fluid acts. This arrangement of relative ball sizes is not necessary but has been found convenient because of the range of control pressures that are readily obtainable. When the control pressure is a minimum, the ball 42 rises until all of the passages between the plates 36 are exposed, at which position the valve is fully opened.

It is also to be noted that the spring 49 provides a relatively small proportion of the total force acting on the ball 44. In fact, the spring 49 and its associated apparatus including the roller 45 are, strictly speaking, not necessary, and the valve will operate without them. However, their inclusion is recommended because these parts stabilize the operation of the valve under certain extreme conditions.

As in the case of the embodiment of FIG. 1, there is very little friction, and, accordingly, the valve responds to very small changes in control pressure.

Figure 6:
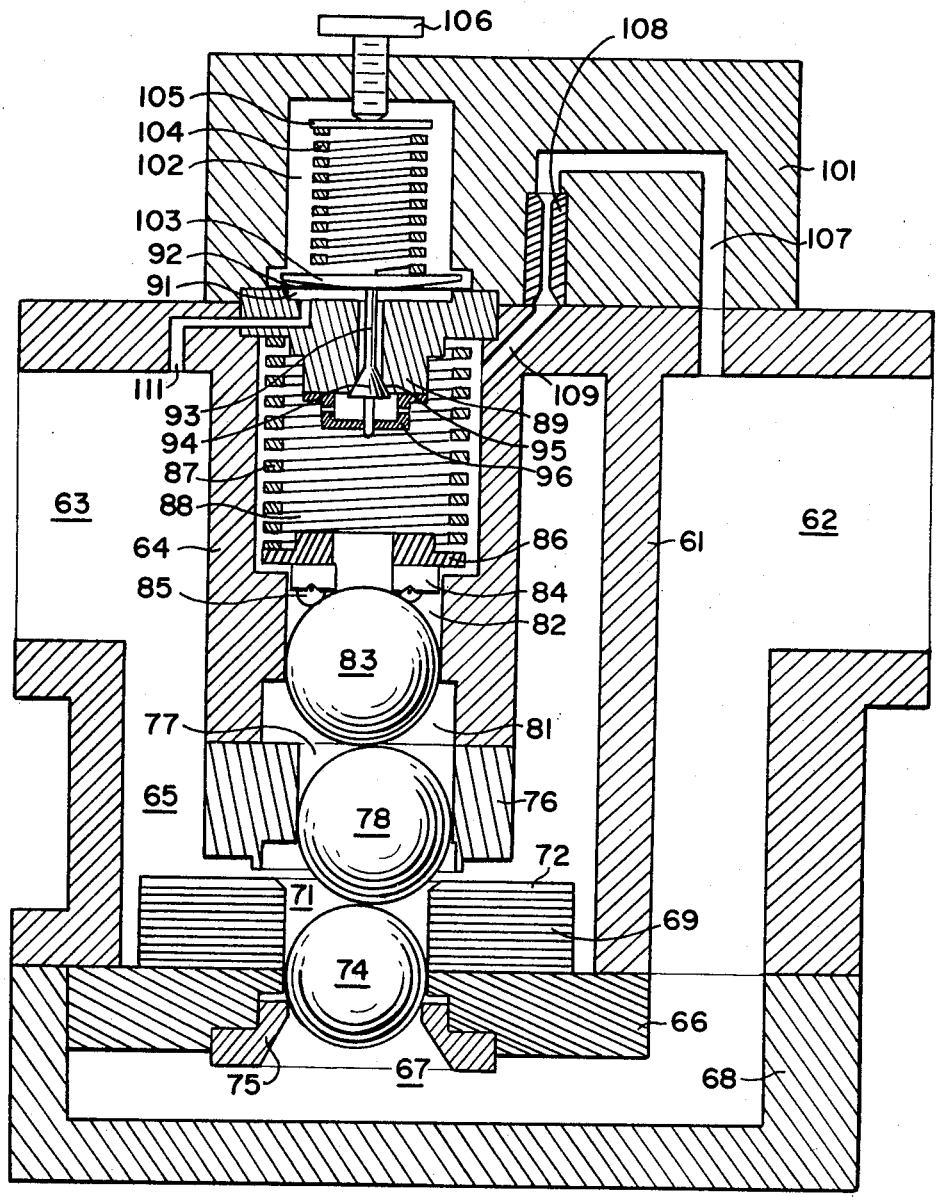
FIG. 6 is a cross-section view, partly schematic, of a valve incorporating the present invention which is particularly suitable for use with a gaseous fluid such as steam.

Referring now to FIG. 6, there is shown a valve incorporating the invention which is particularly suitable for use with a gaseous fluid such as steam. This figure is also a simplified schematic drawing. Many parts such as bolts, gaskets, and seals have been omitted for clarity. Similarly, some parts have been shown as single pieces which in actual construction might well be more than one piece, and vice versa.

The housing includes several blocks including a central block 61 formed to define an inlet passageway 62, an outlet passageway 63, and, along with the depending portion 64, an annular space 65. The depending portion 64 is formed with a generally cylindrical opening as will be more fully discussed. Also shown is an intermediate block 66 shaped in general like a thick plate and formed with a cylindrical passageway or bore 67, which plate is fastened to the central block 61. Also shown is a lower block 68 fastened to the central block 61 as shown. These blocks together define a continuation of the inlet passageway 62, which leads to the generally cylindrical passageway 67.

Above the intermediate plate 66 are a stack of thin plates 69 formed with a central bore 71, the same diameter as and coaxial with the bore 67. The plates of 69 are quite similar to the plates 36 previously described. Each is formed with a plurality of baffles on one side and the plates are brazed together so as to form passageways from the central bore 71 outward to the annular space 65. The stack of plates 69 is fastened on the bottom to the intermediate plate 66 and on the top to a thicker plate 72, also formed with a central bore.

A ball 74 having substantially the same diameter as that of the bores 67 and 71 is positioned within these bores and, in the valve closed position of the parts shown in FIG. 6, rests on a ground seat 75 which limits its downward movement and which is fastened to the intermediate plate 66. When the ball 74 is resting on the seat 75 a complete seal is obtained. The center of the ball 74 in the closed position of the valve as shown, is slightly below the junction of the intermediate plate 66 and the thin plates 69. When the ball 74 rises so that its center is above the uppermost plate 69, all the passages are exposed and the valve is fully opened.

An auxiliary block 76 is fastened to the bottom of the depending portion 64 and is formed to define a cylindrical passageway or bore 77, the diameter of which is larger than that of the bores 67 and 71, and the axis of which is offset slightly to the right of the axis of the bores 67 and 71. A spherical ball 78 of approximately the same diameter as the bore 77 is positioned within this bore and in engagement with the ball 74. The depending portion 64 has an enlarged diameter bore 81 at the bottom and, just above, is formed to define a cylindrical passageway or bore 82. The latter is the same diameter as the bore 77 but is coaxial with the passageway 67. Within the passageway 82 is a spherical ball 83 of approximately the same diameter and which is also in engagement with the ball 78. A carriage 84 has three small wheels 85 journaled thereon, which wheels rest against the top of the ball 83. The wheels 85 preferably have a surface which is a portion of a sphere so as to facilitate engagement of the ball 83. The carriage 84 is supported by a spring seat 86, against which a spring 87 bears. The spring seat 86 and the spring 87 are within a chamber 88, and the upper end of the spring 87 bears against a plug 89, which is fastened to the central block 61 and which closes the upper end of the chamber 88. The upper surface of the plug 89 is formed with a small depression or chamber 91, which is covered by a flexible diaphragm 92. The latter is connected to a small rod 93 which in turn is connected to a conical valve 94, which is shown in FIG. 6 in its closed position against a valve seat 95 formed in the plug 89. A bracket 96 depending from the plug 89 aids in the guiding the valve 94 in its upward and downward movement.

An upper block 101 is fastened to the top portion of the central block 61 and is formed with a chamber 102 positioned just above the chamber 88 and enclosing the diaphragm 92. Within the chamber 102 and resting on the diaphragm 92 is a pressure plate 103 against which a spring 104 bears. The upper end of this spring bears against a spring seat 105, the position of which is adjustable by a screw 106 threaded into the block 101. A passageway 107 is formed in the blocks 101 and 61, and leads from the inlet passageway 62 to a restrictor 108 located in the block 101. The outlet of the restrictor 108 communicates with a passageway 109 formed in the block 61, which passageway in turn communicates with the chamber 88. A passageway 111 formed in the block 61 and the plug 89 leads from the chamber 91 to the outlet passageway 63.

In operation, fluid under pressure is admitted to the inlet passageway 62 and bears against the bottom of the ball 74 attempting to raise it. Initially, there is only atmospheric pressure in the outlet chamber 63, and this pressure is transmitted by the passageway 111 to the chamber 91. The spring 104 overcomes this pressure and depresses the diaphragm 92 thereby opening the valve 94. Some of the fluid from the inlet passageway 62 flows through the passageway 107, the restrictor 108, and the passageway 109 to the chamber 88. Since the valve 94 is open, this fluid flows through the valve and through the space adjacent to the rod 93, the chamber 91 and the passageway 111, to the outlet passageway 63. Accordingly, the pressure in the chamber 88 is relatively low and the force of the inlet fluid on the bottom of the ball 74 raises all three balls. Fluid then flows between one or more of the pairs of plates 69 to the annular passageway 65 and to the outlet passageway 63. This increases the pressure at the outlet and this increase is transmitted through the passageway 111 to the chamber 91 which tends to raise the diaphragm 92 and tends to close valve 94 thereby increasing the pressure in the chamber 88. Eventually an equilibrium position is reached with the pressure in the outlet passageway 63 stabilized at the desired value, which value can be controlled by adjusting the screw 106 to vary the pressure exerted by spring 104 on the diaphragm 92.

It is to be noted that as the balls 74, 78, and 83 move up and down, there is no sliding friction since the balls roll. Since the balls 74 and 83 are aligned while the ball 78 is displaced therefrom, the ball 74 tends to roll against the left hand portion of the bore 71; the ball 78 tends to roll against the right hand portion of the bore 77; and the ball 83 tends to roll against the left hand portion of the bore 82.

It has been found advantageous to use three balls in the steam valve rather than two as illustrated in FIG. 3, for a number of reasons. First, the three balls afford additional strength which is an advantage at the elevated temperature of steam. Additionally, the use of the three balls reduces the leakage from the pilot valve past the balls.

In connection with this leakage, it is to be noted that there is a space between the block 76 and the plate 72 so that steam leaking past the ball 78 can go directly to the passageway 65. This space is not necessary and it could be closed if desired. If it is to be closed, care should be taken to make sure that it is completely closed in order to prevent steam escaping through a small orifice and causing noise. However, it has been found that it is not necessary to close this space since the amount of steam escaping past the balls 83 and 78 is not enough to be troublesome. Additionally, in the closed position of the valve as illustrated in FIG. 6, there is very little leakage past the ball 74 because it rests securely against its seat 75, which seat may be ground to provide a very close fit with the ball 74.

When the valve is first opened, that is when the ball 74 first rises and allows fluid to flow through the valve, the flow is through the lowermost pair of plates 69. If additional flow is required, additional pairs of plates come into operation. This arrangement, whereby additional relatively small passageways are opened as additional flow is required, has been found to result in a very quiet valve at all flow rates within the capacity of the valve.

It is also to be noted that the spring 87 exerts a very small force against the ball 83 compared with the force normally exerted by the fluid within the chamber 88. In fact, the device would operate without the spring 88 and its carriage 84. However, it has been found advantageous to include these items because they stabilize the operation of the valve under certain extreme conditions.

Although a number of preferred embodiments have been described in considerable detail for illustrative purposes, many modifications within the spirit of the invention will occur to those skilled in the art. Similarly, the principles of the invention can be incorporated into other kinds of valves such as four way valves. It is therefore desired that the protection afforded by Letters Patent be limited only by the true scope of the appended claims.

What is claimed is:

1. A fluid flow control valve comprising
   a first ball positioned within said valve and moveable to variably impede the flow of fluid therethrough,
   means defining a linear path of movement of said first ball,
   a second ball in engagement with said first ball, and
   a member for guiding said second ball for movement in a path parallel to but displaced from the path of movement of said first ball,
   whereby when said balls move they tend to roll in engagement with each other and with said means and said member.

2. A fluid flow control valve in accordance with claim 1 in which said member is the wall of a cylindrical bore formed in the housing of said valve.

3. A fluid flow control valve comprising,
   a housing formed to define a first cylindrical passageway to one end of which fluid under pressure is to be admitted,
   said housing also being formed to define an enlarged chamber into which the opposite end of said passageway opens, and from which chamber fluid output is to be taken,
   a first ball having a diameter substantially equal to that of said passageway and positioned on the axis thereof,
   means within said chamber for guiding said ball along a path such that the center of said ball moves along the axis of said passageway as said ball enters said chamber,
   said housing being formed to define a second cylindrical passageway the axis of which is parallel to but displaced from that of said first cylindrical passageway and which opens into said chamber approximately opposite said first passageway,
   a second ball having a diameter substantially equal to that of said second passageway and positioned on the axis thereof in engagement with said first ball, and
   means for applying a control force to said second ball in such a direction as to urge it into engagement with said first ball.

4. A fluid flow control valve in accordance with claim 3 in which said means for guiding includes a plurality of plates each formed with a plurality of baffles on one face thereof, said plates being stacked together and formed with a central bore having the same diameter as said first cylindrical passageway so as to form a plurality of fluid paths between adjacent plates extending from said central bore to the outer edges of said plates, said stack being positioned in said chamber adjacent to and coaxial with said other end of said first cylindrical passageway whereby said first ball may roll in engagement with the inner edges of said plates.

5. A fluid flow control valve in accordance with claim 3 in which said second ball is larger than said first ball.

6. A fluid flow control valve in accordance with claim 3, including means for limiting the movement of said first ball.

7. A fluid flow control valve in accordance with claim 3 including an annular seat for receiving said first ball when positioned remotely from said chamber.

8. A fluid flow control valve in accordance with claim 3 in which said means for applying a control force includes auxiliary passageways formed in said housing for transmitting a fluid control pressure so as to urge said second ball into engagement with said first ball.

9. A fluid flow control valve in accordance with claim 8 in which said passageways are formed so as to apply said fluid control pressure directly to said second ball.

10. A fluid flow control valve in accordance with claim 9 including a spring urging said second ball into engagement with said first ball.

11. A fluid flow control valve in accordance with claim 3 in which said housing is formed to define a third cylindrical passageway coaxial with said first cylindrical passageway having a diameter equal to that of said second cylindrical passageway and communicating with said second passageway at a location remote from said chamber, said valve including a third ball having substantially the same diameter as and positioned within said third cylindrical passageway in engagement with said second ball.

12. A fluid flow control valve in accordance with claim 11 in which said means for applying a control force includes auxiliary passageways formed in said housing for transmitting a fluid control pressure to said third cylindrical passageway so as to urge said third ball into engagement with said second ball which in turn is thereby urged into engagement with said first ball.

13. A fluid flow control valve in accordance with claim 12 including a spring urging said third ball into engagement with said second ball.

14. A valve for controlling the flow of fluid therethrough, comprising, a housing formed to define an inlet passageway, an outlet passageway and a first cylindrical passageway one end of which is in communication with said inlet passageway, a plurality of circular plates each formed with a central bore having a diameter equal to that of said first cylindrical passageway and each formed with a plurality of raised baffles on one side thereof, said plates being positioned and fastened coaxially to form a stack having a central bore and defining a plurality of restrictive passages between each pair of adjacent plates for the passage of fluid from said central bore radially outward, said stack being fastened to said housing so as to be coaxial with and adjacent to said cylindrical passageway at the end opposite its point of communication with said inlet passageway, said housing being formed to define a chamber communicating with said outlet passageway and with the circumference of said stack of plates, a first ball having a diameter substantially equal to that of said first passageway and said central bore and moveably positioned therein, whereby when the center of said ball is within said first passageway the flow of fluid is substantially cut off and whereby as said ball is moved into said central bore the passages between adjacent plates are successively exposed whereby fluid flowing therethrough has its pressure reduced gradually without the generation of high velocities, said housing also being formed to define a second cylindrical passageway the axis of which is parallel to but displaced from that of said central bore, and which passageway is located adjacent to that end of said central bore which is remote from said first passageway, a second ball having a diameter substantially equal to that of and positioned within said second cylindrical passageway and in engagement with said first ball, and means for applying a control force to said second ball in a direction to urge it into engagement with said first ball, whereby when said balls move in response to said control force and to the force exerted on said first ball by fluid in said inlet passageway, said balls tend to roll along each other and along the walls of said cylindrical passageways and bores.

* * * * *